(No Model.)
J. F. McLAUGHLIN.
ELECTRICAL RAILWAY.
No. 332,929. Patented Dec. 22, 1885.
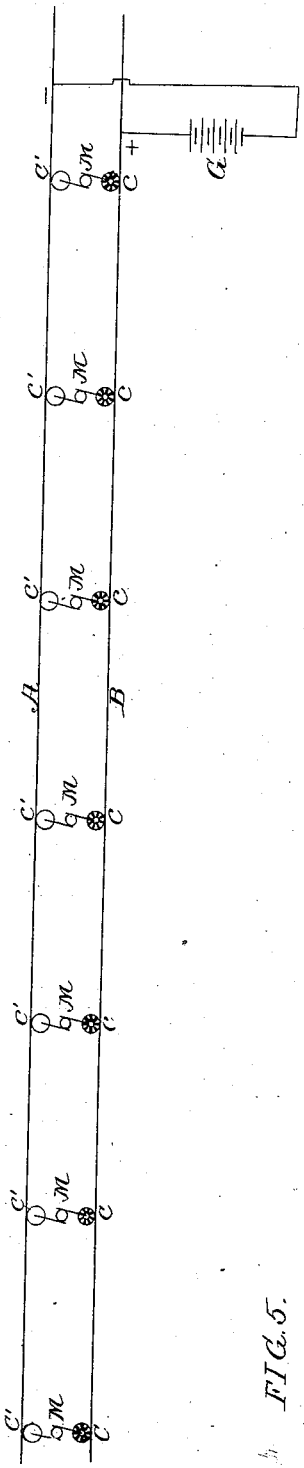
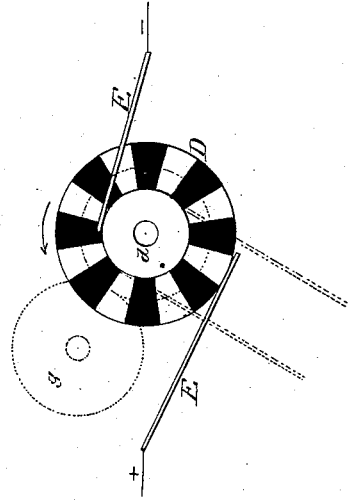
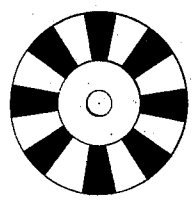
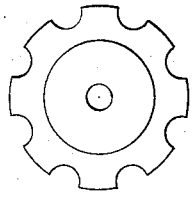
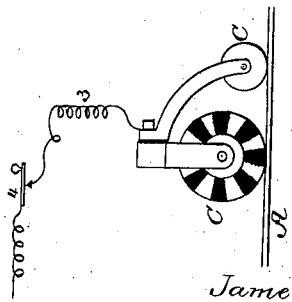
Witnesses:
John E. Parker
David S. Williams
Inventor:
James F. McLaughlin
by his Attorneys
Howson & Son

UNITED STATES PATENT OFFICE.

JAMES F. McLAUGHLIN, OF PHILADELPHIA, PA., ASSIGNOR TO THE NATIONAL ELECTRIC RAILWAY SYSTEM, (LIMITED,) OF SAME PLACE.

ELECTRICAL RAILWAY.

SPECIFICATION forming part of Letters Patent No. 332,929, dated December 22, 1885.

Application filed October 7, 1885. Serial No. 179,192. (No model.)

*To all whom it may concern:*

Be it known that I, JAMES F. McLAUGHLIN, a citizen of the United States, residing at Philadelphia, Pennsylvania, have invented certain Improvements in Electrical Railways, of which the following is a specification.

My invention consists of an improved method of operating electrical railways, the main object of my invention being to provide for the running of a larger number of cars on a circuit with the motors in multiple arc than is possible in the ordinary way. The devices by which this method may be carried into effect form the subject of Letters Patent No. 328,420, granted to me October 13, 1885; but in order that my invention may be clearly understood I have illustrated such devices in the accompanying drawings.

Figure 1 is an illustrative diagram. Fig. 2 is an enlarged view of a contact-wheel, which may be used in carrying out my invention. Fig. 3 is a view of a modified form of wheel. Fig. 4 is a view illustrating how the contact-wheel may be applied, and Fig. 5 is a diagram illustrating a further modification.

Referring to the diagram Fig. 1, A and B represent the main conductors of the line, which may be the ordinary track-rails or conductors laid alongside thereof or in a conduit between the track-rails; and G is the stationary generator supplying the current to run the motors on the various cars, one of the conductors A B forming the outward conductor, while the other is the return-conductor.

M M represent the motors in the various cars, seven being illustrated in the diagram; and C C' represent the contacts, which in this case are shown as being in the form of wheels running in connection with the conductors A B. The number of cars which can be run in such a system of multiple arc is necessarily limited by practical considerations. In order to increase this limit without increasing the size of the conductors, I supply the current from the main conductor to each motor in its derived circuit between the line-conductors intermittently, but at such rapid intervals as not to interfere with the practically-continuous operation of the motor, and the devices whereby the current is fed intermittently to the several motors are so arranged relatively to each other that the current will not at any specific moment be supplied to the entire number of motors on the section. In other words, some of the motors will be out of circuit while others are in circuit. As a means of carrying this into practical effect, one or both of the contact-wheels C C' may be constructed so as to make an interrupted connection with the said conductors A B by building the wheel up with alternating metallic and insulating segments, as illustrated in Fig. 2, or by notching the wheel, as shown in Fig. 3, so that as the car travels on the track, and the wheel C, for instance, travels in contact with the conductor A, the motor of the car will receive an intermittent current from the conductor A, and in practical operation the contact-wheel C of the several cars will occupy different relative positions, so that while some of them at any one moment would be making contact with the electrical conductor A others would be out of contact therewith, and although the number of motors out of circuit at specific different times might vary to some extent, yet for practical purposes that would not seriously interfere with their operation. The rapidity of the making and breaking of the current supplied to each motor will prevent its intermittent character from interfering with its operation.

Other means may be provided for intermitting the current supplied to each motor without interfering with the current on the main conductor. For instance, the interrupting-wheel D (illustrated in Fig. 4) may be placed at any other point in each derived circuit instead of employing a segmental contact-wheel, suitable brushes, E E', being provided, one to bear on the compound portion of the wheel and the other on the metallic ring or hub d. This circuit-breaker may be adapted to be operated by a belt, f, from any moving portion of the car or motor, or, if desired, may be driven continuously from clock-work mechanism g, or other motive power. In the latter case the circuit-breakers on the several cars may be timed to run in concert or synchronously, so that a certain number of motors on the section or circuit will always be out of circuit at any time that the others are in circuit.

In practical operation, where one of the contact-wheels, C, is used to interrupt the circuit, it will be necessary to provide for the contingency of the car stopping, so as to leave the wheel with the insulated portion thereof in contact with the conductor, as illustrated in Fig. 5. In such case a supplementary contact, c, may be provided with a conductor, 3, and switch or key 4, forming the branch circuit leading to the motor, which may be closed by the operator at any time to supply the current to the motor.

I claim as my invention—

1. The herein-described method of operating a series of electrical-railway cars with motors in multiple arc, said method consisting in intermitting the current in the derived circuits between the line-conductors, some of the motors being thrown out of circuit while others are in circuit.

2. The herein-described method of operating a series of electrical-railway cars with the motors in multiple arc, said mode consisting in intermitting the current in the derived circuits between the line-conductors, some of the motors being thrown out of circuit while others are in circuit, and operating the circuit-breakers synchronously, substantially as set forth.

In testimony whereof I have signed my name to this specification in the presence of two subscribing witnesses.

JAMES F. McLAUGHLIN.

Witnesses:
JOHN E. PARKER,
HARRY SMITH.